(No Model.)
E. G. MACOMBER.
FERTILIZER DISTRIBUTER.
No. 338,852. Patented Mar. 30, 1886.
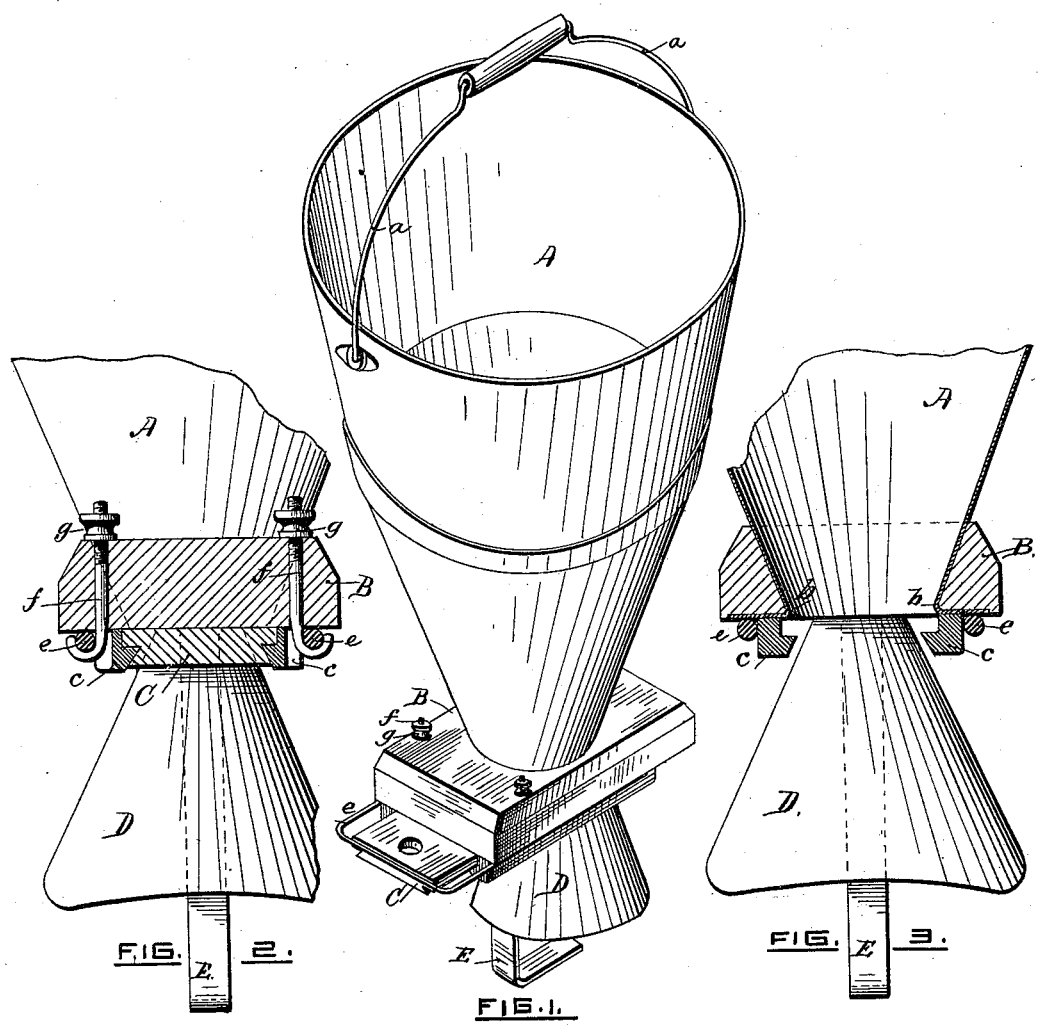
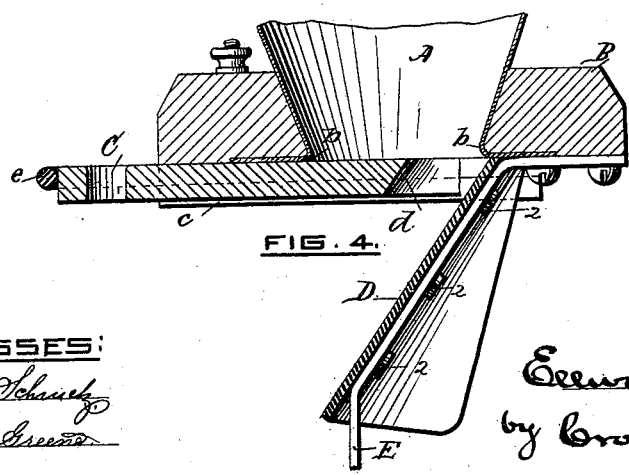
WITNESSES:
Chas. F. Schautz
Howard Greene
INVENTOR:
Ellwood G. Macomber
by Crosby & Gregory
Attys.

UNITED STATES PATENT OFFICE.

ELLWOOD G. MACOMBER, OF PORTSMOUTH, RHODE ISLAND.

FERTILIZER-DISTRIBUTER.

SPECIFICATION forming part of Letters Patent No. 338,852, dated March 30, 1886.

Application filed July 16, 1885. Serial No. 171,734. (No model.)

*To all whom it may concern:*

Be it known that I, ELLWOOD G. MACOMBER, a citizen of the United States, and a resident of Portsmouth, in the county of Newport and State of Rhode Island, have invented an Improvement in Fertilizer-Distributers, of which the following description, in connection with the accompanying drawings, is a specification, like letters on the drawings representing like parts.

This invention has for its object to provide a fertilizer-distributer simple in construction and light in weight, so as to be readily carried about by hand, thus making a handy and convenient device for farmers who do not wish to use large machines for distributing fertilizer in places requiring only a small quantity of fertilizing material, and to scatter the fertilizer evenly.

To this end my invention consists of a receptacle provided with a bail, and having a gate or slide at its bottom to shut off the supply, so that it may be carried to the spot required without wasting or losing any of its contents, and of a spreading or deflecting plate under the opening of said gate, to evenly scatter the fertilizer when discharging from the receptacle.

My invention also consists of certain details of construction, as hereinafter fully set forth.

Figure 1 is a perspective view of my improved fertilizer-distributer, showing the gate opened to the extent allowed by the gage. Fig. 2 is a transverse section through the gate-board on line with the clamp-screws for the gate-gage. Fig. 3 shows a transverse section through the center of the reservoir, the gate being removed; and Fig. 4 is a longitudinal section through the center, showing the gate partially open.

The receptacle A, having a bail, *a*, and being preferably made of thin metal, tapers toward the bottom, where its end is inserted through an opening in the gate-board B, and then bent around its edge, as at *b*, thus forming a close connection with the gate C, (see Fig. 4,) and at the same time serving as a holder for the gate-board, which in its turn carries the rest or support E, on which the fertilizer distributing or deflecting plate D is attached by means of screws or rivets 2. On the under side of the gate-board B are fastened the guides *c c*, which serve to hold the gate C against the bent portion of the receptacle A.

The gate C is made to fit between the guides, and is cut away, as at *d*, in order to conform to the shape of the distributing-plate D, and to provide a tight joint when closed, while the extent of the opening is governed by means of a U-shaped wire gage, *e*, the arms of which are held on the outside of the guides *c c*, and are clamped in any position by the screws *f f*, having thumb-nuts *g g*, and being flattened and bent at the bottom, so as to form a socket, in which the wire *e* is placed.

By tightening the thumb-nuts *g g* the wire is drawn hard against the under side of the gate-board, and is thus held in position, while the front or base of the gage-wire serves as a stop for the gate C, which regulates the discharge of material from the receptacle.

The deflecting-plate is made tapering toward the opening at the bottom of the receptacle A, this being, as proved by experiment, the most desirable and effective form for scattering the material evenly across its width on the ground.

It is important to prevent clogging of earth on the deflecting-plate, for which purpose I provide a rest or support, E, as shown in the drawings, secured to the under side of the gate-board B, to keep the plate above ground, and also to serve as a foot or resting-base for the apparatus as a whole.

What I claim is—

1. A fertilizer-distributer consisting, essentially, of a pail having a tapering lower portion provided with a single discharge-opening, as specified, the said pail having secured thereto below the discharge-opening a gate-board provided with a sliding gate to wholly or partially close the discharge-opening, a gage to limit the movement of the gate, and a deflecting-plate secured to the gate-board with its upper end to one side of the discharge-opening, substantially as specified.

2. A fertilizer-distributer consisting, essentially, of a pail having a tapering lower portion provided with a discharge-opening, as specified, the said pail having a gate-board secured thereto at the discharge-opening, and provided with a sliding gate, a gage to limit the movement of the gate, a rest or support attached to the gate-board, and a deflecting-plate, D, secured to the rest, with its upper end arranged to one side of the discharge-opening, substantially as described.

3. In a fertilizer-distributer, the combination, with the receptacle having a tapering lower portion ending in a single discharge-opening, as specified, of a gate-board secured to the tapered end of the receptacle about the discharge-opening and provided with a sliding gate, the U-shaped gage, and adjusting screws and nuts, the rest E, attached to the gate-board to one side of the discharge-opening, and the deflecting-plate secured to the rest and made tapering from bottom to top, with its upper end arranged to one side of the discharge-opening, as specified.

In testimony whereof I have signed my name to this specification in the presence of two subscribing witnesses.

ELLWOOD G. MACOMBER.

Witnesses:
CHAS. F. SCHMELZ,
HOWARD GREENE.